(12) United States Patent
Poehlman et al.

(10) Patent No.: US 6,647,942 B2
(45) Date of Patent: Nov. 18, 2003

(54) ENGINE STARTING AND STOPPING DEVICE

(75) Inventors: Art Poehlman, West Bend, WI (US); Robert K. Mitchell, Brookfield, WI (US); Gary J. Gracyalny, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 199 days.

(21) Appl. No.: 09/940,032

(22) Filed: Aug. 27, 2001

(65) Prior Publication Data

US 2002/0023608 A1 Feb. 28, 2002

Related U.S. Application Data

(63) Continuation-in-part of application No. 09/709,859, filed on Nov. 10, 2000, which is a continuation of application No. 09/183,425, filed on Oct. 30, 1998, now Pat. No. 6,230,678.

(51) Int. Cl.[7] ................................................. F02N 5/02
(52) U.S. Cl. ................................. 123/185.14; 123/185.3
(58) Field of Search ........................ 123/185.14, 185.2, 123/185.3; 185/41 A; 74/7 R, 7 C; 56/10.5

(56) References Cited

U.S. PATENT DOCUMENTS

| | | | |
|---|---|---|---|
| 932,735 A | 8/1909 | Willard | |
| 950,848 A | 3/1910 | Gardner | |
| 1,009,503 A | 11/1911 | Goodhart | |
| 1,022,087 A | 4/1912 | Jenney | |

(List continued on next page.)

FOREIGN PATENT DOCUMENTS

| | | |
|---|---|---|
| FR | 2639677 | 6/1990 |
| GB | 676850 | 8/1952 |
| JP | 62-53703 | 3/1983 |
| JP | 58051271 | 3/1983 |
| WO | WO 98/57062 | 12/1998 |
| WO | WO 00/26531 | 5/2000 |

OTHER PUBLICATIONS

16 CFR Sec. 1205.1–1205.36, see specifically 16 CFR 1205 (a) and (c), published prior to Oct. 30, 1997 by the Office of the Federal Register National Archives and Records Administration, United States of America.

*Primary Examiner*—Mahmoud Gimie (74) *Attorney, Agent, or Firm*—Michael Best & Friedrich LLP (57) ABSTRACT

An internal combustion engine includes a spring housing rotatably mounted to the engine's engine housing for rotation about an axis of rotation. An energy storing mechanism including at least one elastic member is housed within the spring housing. A spring loading mechanism includes at least one roller movable into and out of engagement between the engine's flywheel and the spring housing, such that rotation of the flywheel is converted through the at least one roller to cause rotation of the spring housing in a direction that loads the elastic member. An engine starting mechanism includes a helically threaded member interconnected with the spring housing and a starter pinion threaded onto the helically threaded member. Rotation of the spring housing in response to unloading of the elastic member causes the starter pinion to move into engagement with the flywheel, thereby rotating the flywheel and starting the engine.

16 Claims, 6 Drawing Sheets

U.S. PATENT DOCUMENTS

| | | |
|---|---|---|
| 1,097,899 A | 5/1914 | Volkmar |
| 1,099,685 A | 6/1914 | Bennett |
| 1,137,358 A | 4/1915 | Sinclair |
| 1,394,619 A | 10/1921 | Hanson |
| 1,936,554 A | 11/1933 | Lansing |
| 2,293,322 A | 8/1942 | Veach |
| 2,922,411 A | 1/1960 | Skinner |
| 2,999,489 A | 9/1961 | Coughlin et al. |
| 3,139,877 A | 7/1964 | Graybill |
| 3,151,605 A | 10/1964 | Tillotson et al. |
| 3,165,100 A | 1/1965 | Svendsen |
| 3,290,871 A | 12/1966 | Haas |
| 3,301,243 A | 1/1967 | Lyvers |
| 3,324,842 A | 6/1967 | Haas |
| 3,375,814 A | 4/1968 | Hamman |
| 3,395,687 A | 8/1968 | Harkness |
| 3,447,523 A | 6/1969 | Bradbury et al. |
| 3,692,010 A | 9/1972 | Dooley et al. |
| 3,853,109 A | 12/1974 | Dooley |
| 3,861,374 A * | 1/1975 | Dooley et al. ......... 123/185.14 |
| 3,960,246 A | 6/1976 | Fisher |
| 4,067,243 A | 1/1978 | Kurata et al. |
| 4,104,927 A * | 8/1978 | Jensen et al. .......... 123/185.14 |
| 4,176,648 A | 12/1979 | Gotoh et al. |
| 4,230,084 A | 10/1980 | Gotoh et al. |
| 4,363,298 A | 12/1982 | Kuhn |
| 4,441,466 A | 4/1984 | Tangorra |
| 5,086,890 A | 2/1992 | Turczyn et al. |
| 5,186,134 A | 2/1993 | Morishima et al. |
| 5,431,135 A | 7/1995 | Tyler |
| 5,537,966 A | 7/1996 | Ohnishi |
| 5,596,902 A | 1/1997 | McMillen |
| 5,970,940 A | 10/1999 | Penton |
| 6,230,678 B1 | 5/2001 | Gracyalny et al. |

* cited by examiner

ENGINE STARTING AND STOPPING DEVICE

This application is a continuation-in-part of U.S. Ser. application No. 09/709,859 filed Nov. 10, 2000, which is a continuation of U.S. application Ser. No. 09/183,425 filed Oct. 30, 1998, now U.S. Pat. No. 6,230,678. The entire contents of both prior applications are incorporated herein by reference.

BACKGROUND

The invention relates to a starting and stopping device for an internal combustion engine. More specifically, the present invention relates to a mechanism for starting the engine by unloading stored power in an elastic member.

SUMMARY

The invention provides an internal combustion engine comprising an engine housing, a crankshaft mounted for rotation within the engine housing, a flywheel mounted to the crankshaft for rotation therewith in a starting direction during startup and operation of the engine, and a spring housing rotatably mounted to the engine housing. An energy storing mechanism, including at least one elastic member, is housed within the spring housing. The elastic member is loaded in response to the spring housing rotating in a loading direction, and the spring housing rotates in an unloading direction opposite the loading direction in response to unloading of the elastic member.

The engine also includes a spring loading mechanism including at least one roller movable into and out of engagement between the flywheel and the spring housing, such that rotation of the flywheel in the starting direction is converted through the at least one roller into rotation of the spring housing in the loading direction.

An engine starting mechanism is also provided that preferably includes a helically threaded member interconnected with the spring housing, and a starter pinion threaded onto the helically threaded member, such that rotation of the spring housing in the unloading direction causes the starter pinion to move into engagement with the flywheel. The starter pinion thus converts rotation of the spring housing in the unloading direction into rotation of the flywheel in the starting direction to start the engine. The starter pinion may be a friction roller or a toothed gear. A control system is also provided for releasing the elastic member from a loaded state to cause rotation of the spring housing in the unloading direction.

Preferably, the above-described at least one roller includes a first roller movable into and out of engagement with the flywheel and a second roller movable into and out of engagement with the spring housing. The first and second rollers are preferably coupled for rotation together such that rotation of the flywheel in the starting direction is converted through the first and second rollers into rotation of the spring housing in the loading direction.

An overwind clutch may be operatively disposed between the first and second rollers to couple the first and second rollers for rotation together. When a threshold torque is achieved between the first and second rollers (i.e., when the stored load in the elastic member reaches a high level), the overwind clutch will permit relative rotation between the first and second rollers to reduce the likelihood of damaging the spring.

A one-way clutch is preferably used to either interconnect the elastic member with an arbor in the spring housing, or to support the arbor with respect to the engine housing. The one-way clutch reduces the likelihood of damage to the inner end of the elastic member during unloading.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
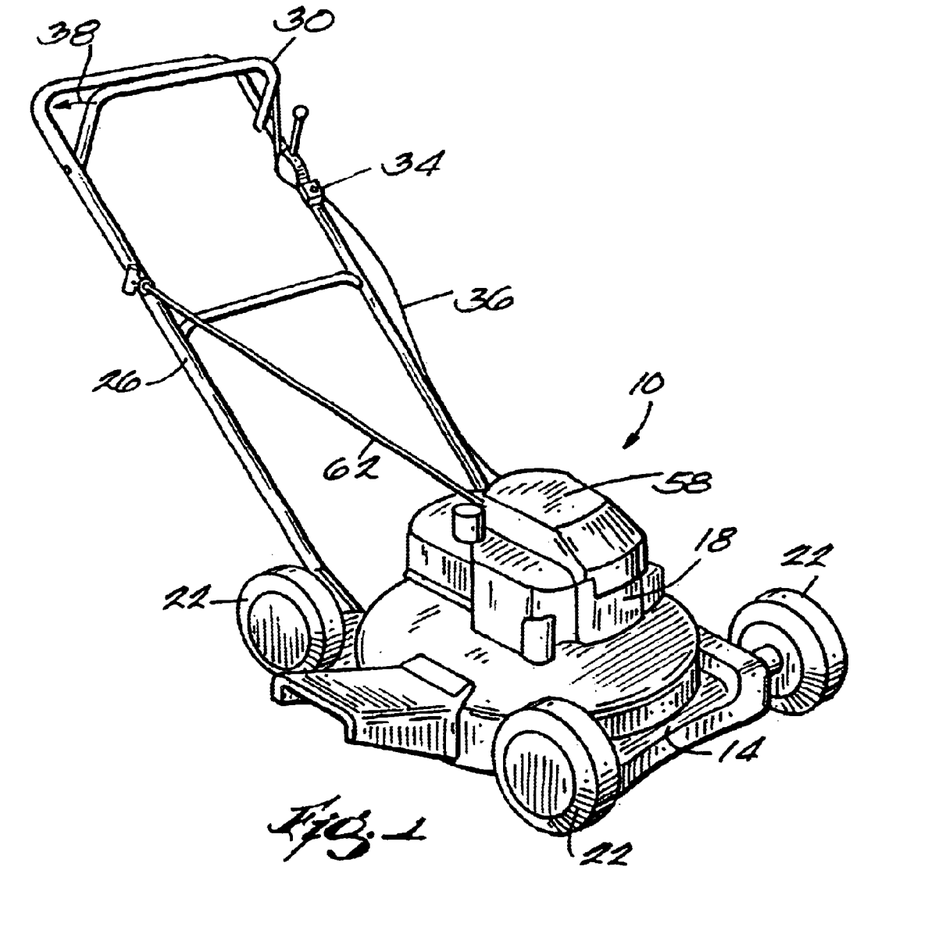
FIG. 1 is a perspective view of a lawnmower embodying the present invention.

FIG. 1 illustrates a lawnmower 10 comprising a deck 14, a blower housing or stationary housing 18, an engine 20 (FIG. 2) mounted to the deck 14 and supporting the stationary housing 18, a set of wheels 22 supporting the deck 14 above the ground, and a handle assembly 26 extending up from the deck 14. The lawnmower 10 also includes first and second manual actuators, which are a bail handle 30 and push button 34 in the illustrated embodiment, supported on the handle 26 at a location remote from the engine 20. The bail handle 30, or alternatively the push button 34, is operatively interconnected with mechanisms in the engine 20 by way of a cable 36. As will be described below in more detail, the bail handle 30 and push button 34 must both be actuated in order to start up the engine 20. The bail handle 30, push button 34, and cable 36 are part of the control system of the engine 20. Alternatively, other types of manual actuators may be used, such as levers, knobs, removable keys, etc.

It should be noted that although the invention is illustrated as embodied in a lawnmower 10, the invention may be embodied in other devices powered by either a four-stroke or two-stroke cycle internal combustion engine. In some applications it may be desirable to have a two-step engine starting sequence. In other applications, it may be that only a single manual actuator, such as a push button or a bail handle, is actuated to start the engine 20.

During operation of the lawnmower 10, the bail handle 30 must be moved to a start position 38 (FIG. 1) near the end of the handle assembly 26 to keep the engine 20 operating. The bail handle 30 is biased to move to a rest position (see FIG. 1) once let go by the operator. This causes the ignition circuit of the engine 20 to be grounded and shutdown of the engine 20 to be initiated. In order to move the bail handle 30 to the start position 38, the push button 34 must first be depressed and held while the bail handle 30 is moved. Depressing the push button 34 disengages a lock on the bail handle 30 or on another movable member in the engine starting mechanism (discussed in further detail below) that is required to start the engine 20. Alternatively, the bail handle 30 and push button 34 may be configured such that the bail handle 30 must first be moved to the start position 38 to enable the push button 34 to be actuated, in which case actuation of the push button 34 starts the engine 20.

Figures 2, 3:
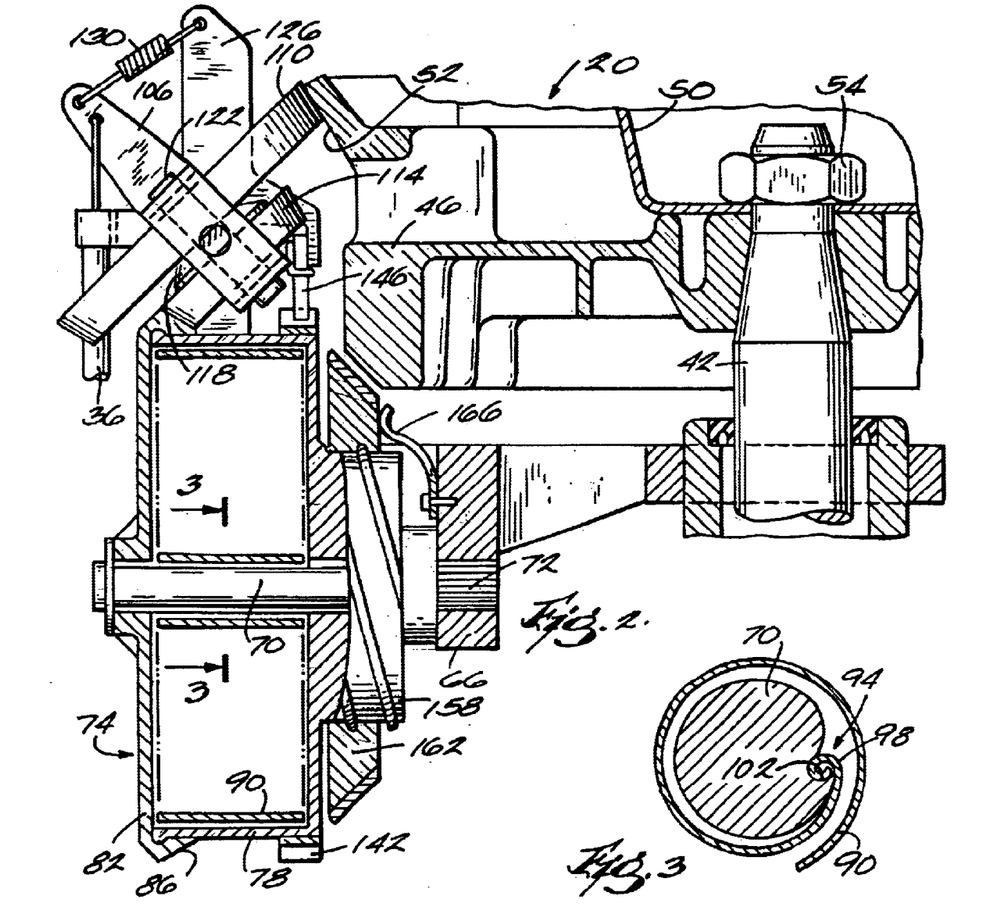
FIG. 2 is a cross-section view of a portion of the lawnmower illustrated in FIG. 1 with a spring loading mechanism in an engaged position.
FIG. 3 a cross-section view taken along line 3—3 in FIG. 2.

Turning now to FIG. 2, the engine 20 includes a crankshaft 42 that rotates in a known manner to drive a cutting blade positioned under the deck 14 of the lawnmower 10. The crankshaft 42 may be vertically-oriented as in the illustrated embodiment such that the cutting blade is attached directly to the lower end of the crankshaft 42. Alternatively, it can be oriented horizontally or non-vertically. Mounted to the top end of the crankshaft 42 are a flywheel 46 and a starter cup 50. The flywheel 46 includes a beveled edge 52. A nut 54 may be threaded onto the end of the crankshaft 42 to secure the starter cup 50 and flywheel 46 to the top end of the crankshaft 42, as illustrated.

A conventional recoil starter assembly 58 (FIG. 1) is rotatably mounted to the stationary housing 18 above the flywheel 46, crankshaft 42, and starter cup 50. The recoil starter 58 includes dogs that engage the starter cup 50 to rotate the crankshaft 42 when a starter rope 62 (FIG. 1) is pulled. The engine 20 may be started in a conventional manner by pulling on the starter rope 62.

Mounted on the side of the engine 20 (e.g., to an engine housing 66 or crankcase) is an arbor 70. In the illustrated construction, the arbor 70 is substantially horizontal, and is perpendicular to the crankshaft 42. In alternative constructions, however, the arbor 70 may be tilted with respect to horizontal, and may be non-parallel and non-perpendicular to the crankshaft 42. The arbor 70 includes an end 72 that is fixed to the engine housing 66 (e.g., by way of welding, integral forming, keying, or by way of the illustrated splines or another anti-rotational interconnection) such that there is no relative rotation between the arbor 70 and the engine housing 66.

With reference to FIGS. 2 and 3, the arbor 70 rotatably supports a spring housing 74 which includes a cylinder 78 and an end cap 82 having a beveled edge 86. The cylinder 78 and end cap 82 are fixed to each other (e.g., by a shrink fit, snap fit, or threaded interface, or by welding) for rotation together. An elastic member or spring 90, which is a coil of spring steel in the illustrated embodiment, is housed within the spring housing 74. The outer end of the spring 90 is fixed to the spring housing 74 with a bolt, hook, or the like, and the inner end 94 of the spring 90 is releasably attached to the arbor 70 by way of a one-way clutch. The one-way clutch construction shown in FIG. 3 includes a hook 98 (described by the inner end 94 of the spring 90) and an eyelet 102 (formed in the side of the arbor 70).

FIGS. 2–6 illustrate a spring loading mechanism that includes a pivotable bracket 106, a flywheel roller 110, a spring housing roller 114, and an overwind clutch 118 disposed between the flywheel roller 110 and spring housing roller 114. The rollers 110, 114 each include a beveled frictional edge preferably including a high friction surface or a resilient material such as rubber. As used herein, "rollers" means either the resilient (e.g., rubber) friction rollers illustrated or toothed members such as gears.

Figure 5:
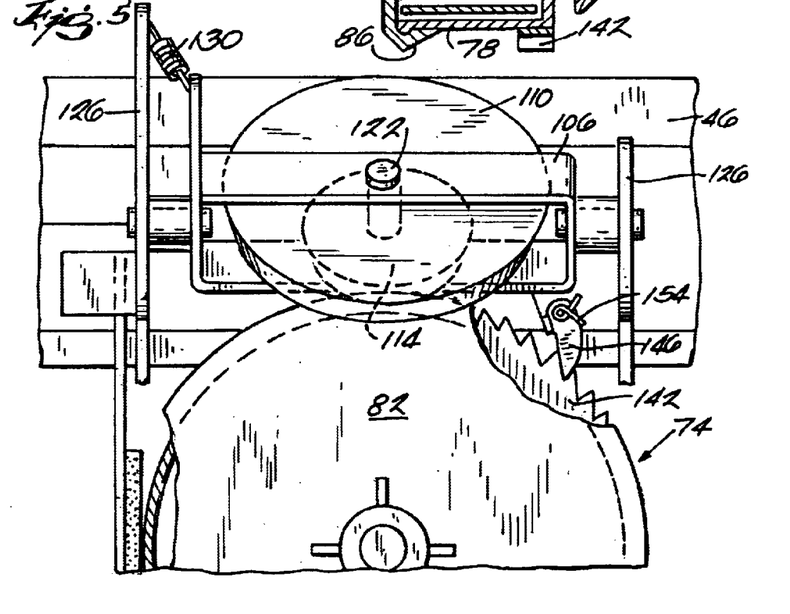
FIG. 5 is a perspective view of the spring loading mechanism illustrated in FIGS. 2 and 4.

The rollers 110, 114 are supported for rotation on a roller axle 122, and the overwind clutch 118 couples the rollers 110, 114 for rotation together. The overwind clutch 118 is preferably a friction clutch that will slip if a selected torque is achieved. As seen in FIG. 5, the pivotable bracket 106 is pivotably mounted to a pair of upright members 126 that are fixed to the stationary housing 18 or the engine housing 66.

Figure 4:
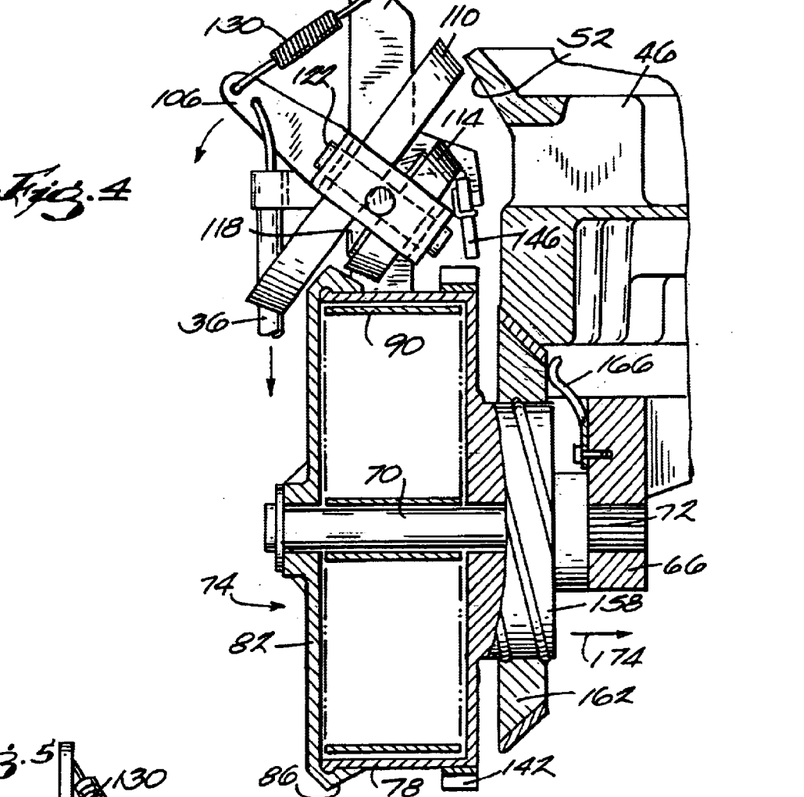
FIG. 4 is a cross-section view similar to FIG. 2, except the spring loading mechanism is in a disengaged position.

The pivotable bracket 106 is pivotable between the engaged position illustrated in FIG. 2 and the disengaged position illustrated in FIG. 4. A return spring 130 biases the pivotable bracket 106 toward the engaged position. The flywheel roller 110 and spring housing roller 114 are disposed at about a 45° angle with respect to horizontal and engage the beveled edges 52, 86 of the flywheel 46 and the end cap 82 of the spring housing 74, respectively, when the bracket 106 is in the engaged position. The rollers 110, 114 disengage the flywheel 46 and end cap 82 when the bracket 106 is in the disengaged position. The cable 36 is interconnected with the pivotable bracket 106 to permit movement of the bracket 106 in response to actuation of one or both of the bail handle 30 and push button 34.

Figure 6:
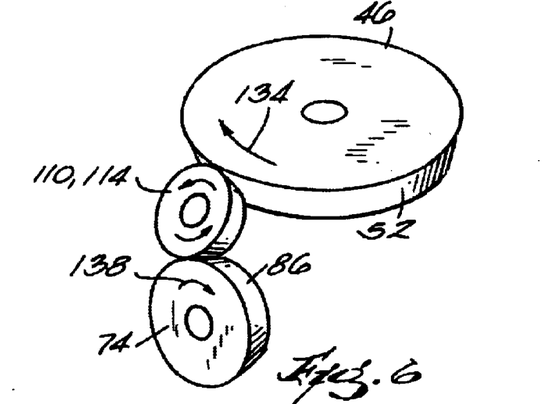
FIG. 6 is a perspective schematic drawing of the flywheel, rollers, and spring housing during loading of the elastic member.

The operation of the spring loading mechanism will now be described. As seen in FIG. 6, the flywheel 46 rotates in an operating or starting direction 134 (clockwise in the illustrated embodiment) during operation of the engine 20. When the bail handle 30 is released and moves to the rest position illustrated in FIG. 1, the spring loading mechanism moves to the engaged position under the influence of the return spring 130. The flywheel roller 110 rotates counterclockwise due to its frictional engagement with the flywheel 46. The spring housing roller 114 also rotates counterclockwise because the overwind clutch 118 couples the rollers 110, 114 together for rotation. The spring housing 74 rotates in a loading direction 138 (clockwise in the illustrated embodiment) due to its frictional engagement with the spring housing roller 114.

As the spring housing 74 rotates in the loading direction 138, the hook 98 at the end of the spring 90 engages the eyelet 102 in the arbor 70 and the spring 90 is tightened around the arbor 70. As the spring 90 is loaded, it creates increasing resistance to further rotation of the crankshaft 42 and flywheel 46 in the starting or operating direction 134. If the spring 90 is loaded during engine coastdown, the spring 90 has a braking effect on the crankshaft 42 and flywheel 46. If the spring 90 is loaded during engine operation, the driving force of the 4-stroke or 2-stroke combustion cycle is sufficient to load the spring 90 without substantially limiting the operation of the engine 20.

Regardless of whether the spring 90 is loaded during engine coastdown or engine operation, the overwind clutch 118 (FIG. 1) permits the flywheel 46 and crankshaft 42 to be uncoupled from the spring 90 once the spring 90 has reached a predetermined load or torsional threshold. More specifically, the frictional forces provided by the overwind clutch 118 that couple the flywheel roller 110 and spring housing roller 114 are overcome once the predetermined load or torsional threshold is reached in the spring 90. Once the spring 90 reaches this predetermined load, the overwind clutch 118 slips and permits the flywheel roller 110 to rotate with respect to the spring housing roller 114 without further loading the spring 90.

The overwind clutch 118 is therefore a means for reducing the incidence of damage to the spring 90 due to overwinding. In this regard, the overwind clutch 118 can be mounted anywhere provided it is operatively positioned between the crankshaft 42 and the spring 90. That is to say that the overwind clutch 118 must be able to uncouple the crankshaft 42 from the spring 90 so that loading of the spring 90 is stopped at the desired threshold even if the crankshaft 42 is still rotating. Although the above-described spring loading system contemplates loading the spring 90 during engine coastdown, the pivotable bracket 106 may be actuated manually or automatically to load the spring 90 during normal operation of the engine 20.

In FIGS. 2, 4, and 5, the engine 20 also includes a locking mechanism that includes a ratchet wheel or ring 142 affixed to the spring housing 74 and a pawl 146 mounted to the pivotable bracket 106. The locking mechanism is part of the engine's control system, along with the bail handle 30, push button 34, and cable 36. When the pivotable bracket 106 is in the engaged position, the pawl 146 permits the spring housing 74 to rotate in the loading direction 138, but prevents the spring housing 74 from rotating in an unloading direction 150 (FIG. 7) opposite the loading direction 138. With reference to FIG. 5, the pawl 146 is biased toward the ratchet wheel 142 by a torsional spring 154. Thus, in the illustrated embodiment, while the engine 20 is at rest the locking mechanism resists unloading of the spring 90.

Figure 7:
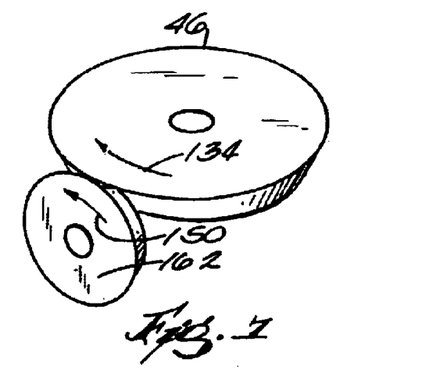
FIG. 7 is a perspective schematic illustration of the flywheel and starter pinion during unloading of the elastic member.

FIGS. 2, 4, and 7 illustrate a spring unloading or engine starting mechanism that causes startup of the engine 20. The engine starting mechanism includes a helically threaded portion 158 integrally formed with or otherwise affixed to the spring housing 74, a starter pinion 162 threaded onto the helically threaded portion 158, and a biasing member (e.g., the leaf spring 166 illustrated in FIGS. 2 and 4) mounted to the engine housing 66. When the pivotable bracket 106 is pivoted to the disengaged position (e.g., when the bail handle 30 and/or push button 34 are actuated), the pawl 146 is disengaged from the ratchet wheel 142, which permits the spring 90 to unload.

As the spring 90 unloads, the spring housing 74 and helically threaded portion 158 rotate together in the unloading direction 150, thereby causing the starter pinion 162 to moves linearly along the helically threaded portion 158 (as shown at 174 in FIG. 4) into engagement with the flywheel 46. The starter pinion 162 includes a beveled frictional edge preferably including a high friction surface or a resilient material such as rubber. The starter pinion 162 causes the flywheel 46 to rotate in the starting direction 134 (as illustrated in FIG. 7) under the influence of the spring 90 unloading.

The hook and eyelet 98, 102 one-way clutch permits the inner end 94 of the spring 90 to slip out of engagement with the arbor 70 once the spring 90 has become substantially unloaded. This helps prevent the inner end 94 from bending back on itself and fatiguing the spring material.

Figure 8:
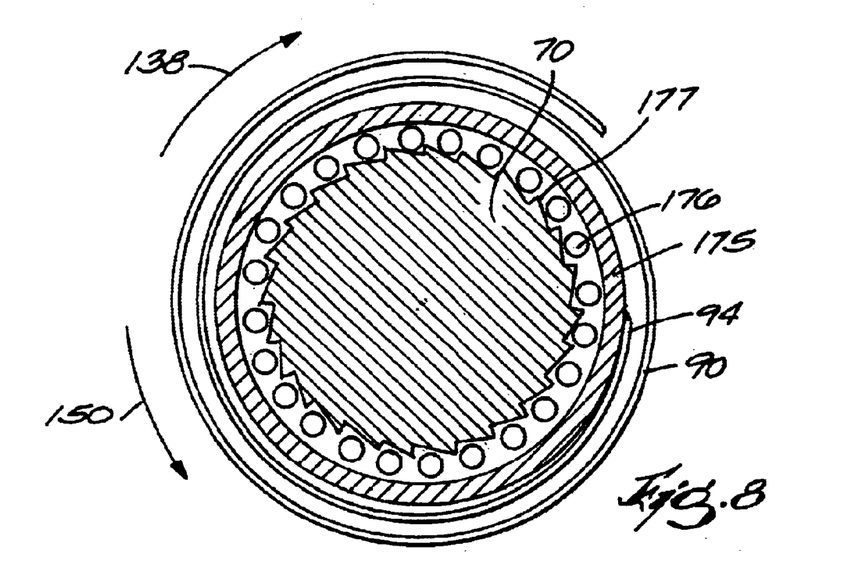
FIG. 8 is a view similar to FIG. 3, showing an alternative one-way clutch.

An alternative one-way clutch construction is illustrated in FIG. 8. This construction includes a sleeve 175 surrounding the arbor 70. The inner end 94 of the spring 90 is affixed to the sleeve 175, as by welding for example. Bearings 176 are between the sleeve 175 and the arbor 70. The bearings 176 engage undercuts, grooves, or slots in either the sleeve 175 or the arbor 70 (e.g., the ramped grooves 177 in the arbor 70 in the illustrated construction) to resist rotation of the sleeve 175 with respect to the arbor 70 in the loading direction 138. Because the sleeve 175 does not rotate with respect to the arbor 70 in the loading direction 138, the spring 90 is wound and tightened around the arbor 70 by the spring loading mechanism described above. However, when the spring 90 has become substantially unloaded, the spring housing 74, spring 90, and sleeve 175 rotate together in the unloading direction 150. Because the spring housing 74, spring 90, and sleeve 175 rotate together in the unloading direction 150, stress and fatigue on the inner end 94 of the spring 90 is reduced.

Figure 9:
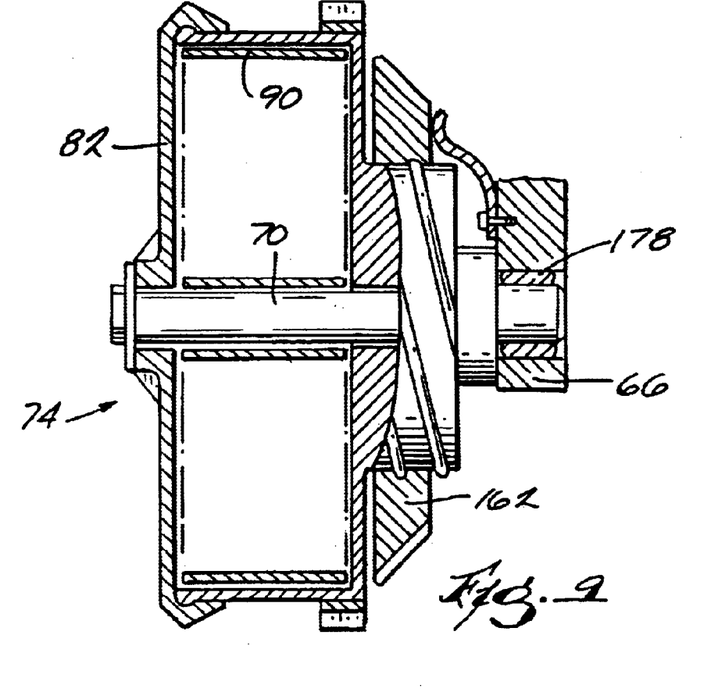
FIG. 9 is a cross section view showing another alternative one-way clutch mechanism.

Another alternative one-way clutch construction is illustrated in FIG. 9, where the inner end 94 of the spring 90 is affixed directly to the arbor 70, as by welding for example. The arbor 70 is supported by a one-way clutch 178 in the engine housing 66. The one-way clutch 178 prevents the arbor 70 from rotating in the loading direction 138 so that the spring 70 may be wound and tightened around the arbor 70 in response to the spring housing 74 rotating in the loading direction 138. The one-way clutch 178 permits the arbor 70 to rotate with the spring 90 and spring housing 74, however, once the spring 90 is substantially unloaded, which helps reduce stress and fatigue on the inner end 94.

Once the crankshaft 42 has turned over sufficiently to startup the engine 20, the two- or four-stroke cycle of the engine is started, and the engine speed ramps up to an operating speed. As the engine 20 picks up speed, the flywheel 46 overruns the starter pinion 162 and rotates the starter pinion 162 along the helically threaded portion 158 to the left as seen in FIG. 2. The biasing member 166 assists the return of the starter pinion 162 to a position out of engagement with the flywheel 46.

Figures 10, 11, 12:
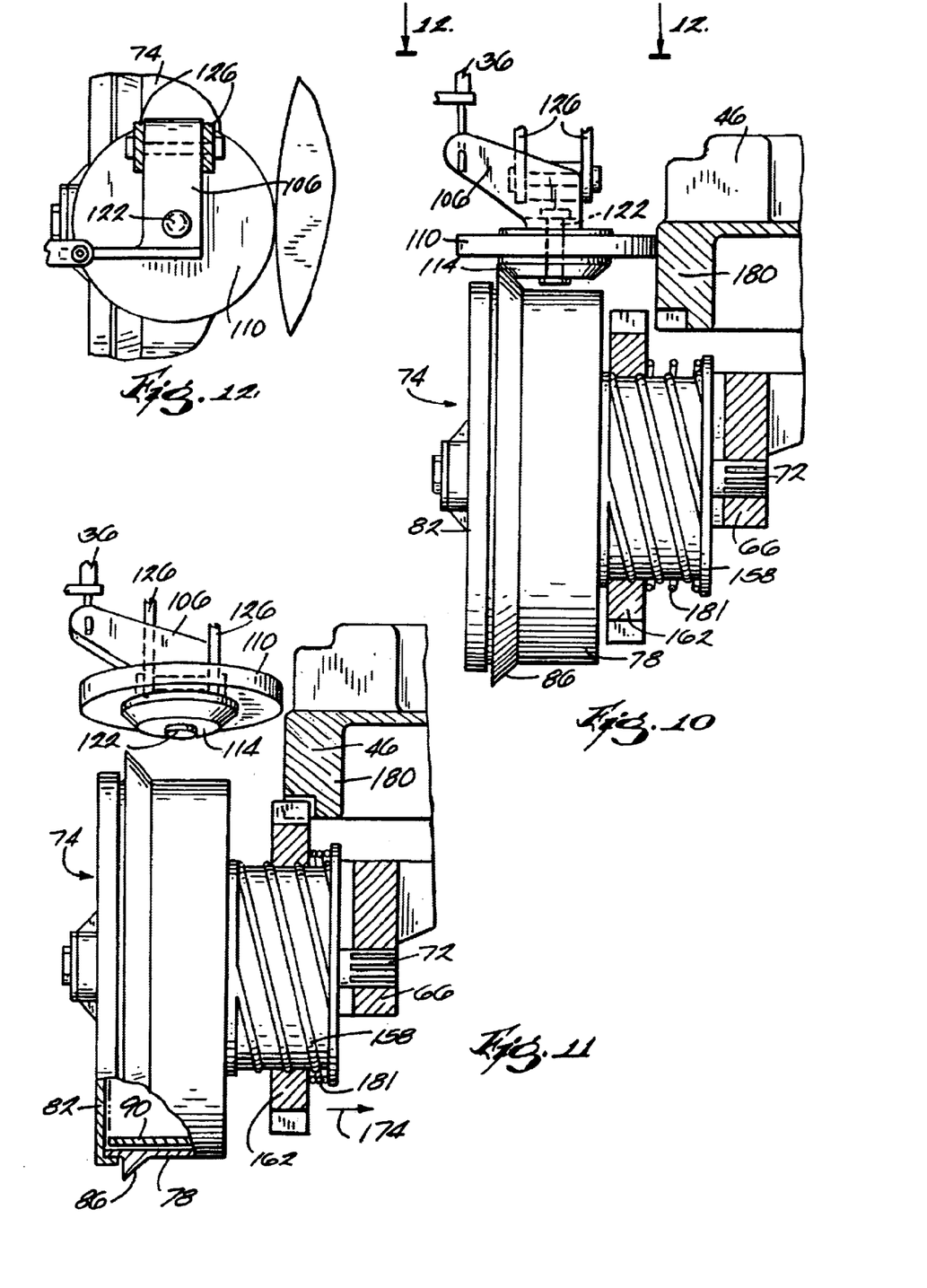
FIG. 10 is a cross-section view of a portion of the engine of FIG. 1 illustrating a second embodiment of the spring loading mechanism in an engaged position.
FIG. 11 is a cross-section view similar to FIG. 10, except the second embodiment of the spring loading mechanism is in a disengaged position.
FIG. 12 is a view of the second embodiment of the spring loading mechanism taken along line 12—12 in FIG. 10.

An alternative embodiment is illustrated in FIGS. 10–12. Where elements are the same or substantially the same as described above, the same reference numerals are used. In this embodiment, the rollers 110, 114 are oriented generally horizontally when in the engaged position (FIG. 10), and the engagement between the flywheel roller 110 and the flywheel 46 does not include a beveled edge. The spring loading mechanism is biased toward the engaged position, and is moved to the disengaged position (FIG. 11) through the cable 36 by actuating the bail handle 30 and/or the push button 34.

The starter pinion 162 in this embodiment takes the form of a pinion gear rather than a roller as illustrated in the first embodiment. The flywheel 46 includes a depending flange 180 having teeth along its lower edge, and the starter pinion 162 engages the teeth of the flywheel 46 in response to the spring 90 unloading. To assist the return of the starter pinion 162 to a position out of engagement with the flywheel 46, a coil spring 181 is employed. Alternatively, the leaf spring 166 illustrated in FIGS. 2 and 4 and described above may be used in place of the coil spring 181.

Figure 13:
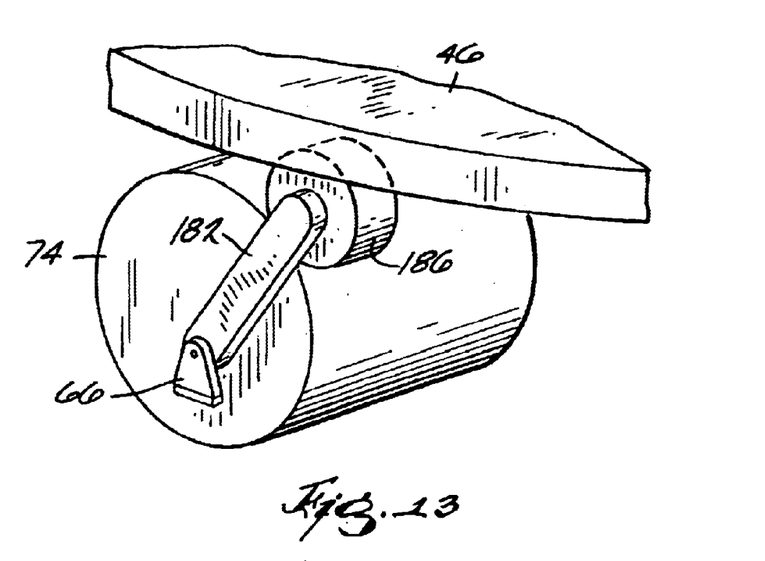
FIG. 13 is a schematic perspective view of a third embodiment of the spring loading mechanism.
Figure 14:
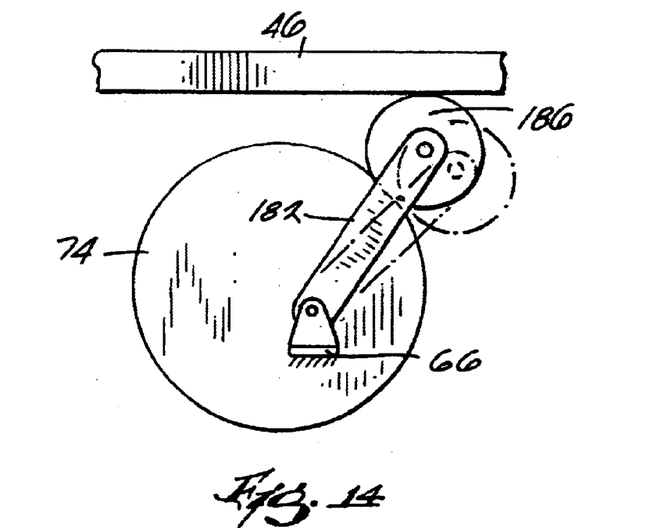
FIG. 14 is a schematic end view of the third embodiment of the spring loading mechanism.

A third embodiment is illustrated schematically in FIGS. 13 and 14. This embodiment includes another version of the spring loading mechanism, and includes an engine starting mechanism that may be substantially the same as either of the starting mechanisms described above. In this embodiment, the spring loading mechanism includes an arm 182 pivotably interconnected with a portion of the engine housing 66. A roller 186 is supported for rotation by the arm 182.

The pivot axis for the arm 182 is non-collinear with the rotational axis of the spring housing 74 such that the roller 186 is removed from contact with both the flywheel 46 and the spring housing 74 when in the disengaged position (shown in phantom in FIG. 14). The roller 186 is movable into an engaged position where it frictionally engages both the spring housing 74 and the flywheel 46 and causes rotation of the spring housing 74 and loading of the spring 90 in response to rotation of the flywheel 46. The roller 186 has a diameter that is greater than the spacing between the spring housing 74 and the flywheel 46 so that the roller 186 cannot pass between the flywheel 46 and spring housing 74.

What is claimed is:

1. An internal combustion engine comprising:
   an engine housing;
   a crankshaft mounted for rotation within said engine housing;
   a flywheel mounted to said crankshaft for rotation therewith in a starting direction during startup and operation of said engine;
   a spring housing rotatably mounted to said engine housing;
   an energy storing mechanism including at least one elastic member housed within said spring housing, said elastic member being loaded in response to said spring housing rotating in a loading direction, and said spring housing rotating in an unloading direction opposite said loading direction in response to unloading of said elastic member;
   a spring loading mechanism including at least one roller movable into and out of engagement between said spring housing and one of said crankshaft and said flywheel, such that rotation of said crankshaft and flywheel in said starting direction is converted through said at least one roller into rotation of said spring housing in said loading direction;
   an engine starting mechanism converting rotation of said spring housing in said unloading direction into rotation of said crankshaft and flywheel in said starting direction to start said engine; and
   a control system for releasing said spring from a loaded state to cause rotation of said spring housing in said unloading direction.

2. The engine of claim 1, wherein said at least one roller includes a first roller movable into and out of engagement with said flywheel and a second roller movable into and out of engagement with said spring housing, said first and second rollers being coupled for rotation together such that rotation of said flywheel in said starting direction is converted through said first and second rollers into rotation of said spring housing in said loading direction.

3. The engine of claim 2, further comprising an overwind clutch operatively disposed between said first and second rollers to couple said first and second rollers for rotation together, but permitting relative rotation between said first and second rollers when a threshold torque is achieved between said first and second rollers.

4. The engine of claim 2, wherein said first and second rollers rotate about a common axis of rotation, and wherein said flywheel and said spring housing include beveled edges to interface with said first and second rollers, respectively.

5. The engine of claim 1, wherein said engine starting mechanism includes a helically threaded member interconnected with said spring housing, and a starter pinion threaded onto said helically threaded member, such that rotation of said spring housing in said unloading direction causes said starter pinion to move into engagement with said flywheel, said starter pinion converting rotation of said spring housing in said unloading direction into rotation of said crankshaft and flywheel in said starting direction to start said engine.

6. The engine of claim 5, wherein said starter pinion includes a beveled edge, and wherein said flywheel includes a beveled edge complimentary to said beveled edge of said starter pinion to facilitate engagement of said starter pinion and flywheel.

7. The engine of claim 5, wherein said starter pinion has an axis of rotation and includes a toothed edge, and wherein said flywheel includes a toothed edge complimentary to, and in meshing engagement with, said toothed edge of said starter pinion to facilitate converting rotation of said spring housing in said unloading direction into rotation of said flywheel in said starting direction to start said engine.

8. The engine of claim 1, further comprising a biasing member biasing said spring loading mechanism toward engagement between said spring housing and one of said crankshaft and said flywheel.

9. The engine of claim 1, wherein said spring loading mechanism includes first and second brackets mounted to said engine housing, a pivotable bracket member pivotably mounted between said first and second brackets, and a shaft mounted to said pivotable bracket member, said at least one roller being mounted for rotation on said shaft between said first and second bracket members.

10. The engine of claim 9, wherein said control system includes a cable interconnected between at least one of said pivotable bracket members and a remote bail handle such that said pivotable bracket pivots said at least one roller into and out of engagement between said spring housing and one of said crankshaft and said flywheel in response to actuation of said bail handle.

11. The engine of claim 1, wherein the axis of rotation of said spring housing is non-parallel with respect to the axis of rotation of said crankshaft.

12. The engine of claim 11, wherein said axis of rotation of said spring housing is perpendicular to the axis of rotation of said crankshaft.

13. The engine of claim 1, further comprising an arbor extending inside and supporting said spring housing, and a one-way clutch interconnecting said elastic member with said arbor when said spring housing rotates in said loading direction, said one-way clutch disengaging said elastic member from said arbor when said elastic member has become substantially entirely unloaded.

14. The engine of claim 1, further comprising:
   an arbor extending inside and supporting said spring housing, said elastic member being fixed to said arbor and fixed to said spring housing; and a one-way clutch mounted in a portion of said engine housing, said one-way clutch supporting said arbor, wherein said one-way clutch resists rotation of said arbor in said loading direction such that said elastic member is loaded in response to said spring housing rotating in said loading direction, and wherein said one-way clutch permits rotation of said arbor in said unloading direction such that said arbor and spring housing rotate in said unloading direction together once said elastic member is substantially unloaded.

15. An internal combustion engine comprising:

an engine housing;

a crankshaft supported within said engine housing and rotatable in a starting direction during startup and operation of said engine;

a flywheel mounted to said crankshaft and rotatable therewith;

a spring housing;

an elastic member within said spring housing, said spring housing being rotatable in a loading direction to load said elastic member, and said spring housing rotating in an unloading direction in response to unloading of said elastic member;

a spring loading mechanism including an arm pivotally supported by said engine housing, and a roller rotatably mounted to said arm; and an engine starting mechanism converting rotation of said spring housing in said unloading direction into rotation of said crankshaft and flywheel in said starting direction to cause startup of said engine;

wherein said arm is pivotal between an engaged position in which said roller interengages said spring housing with at least one of said crankshaft and flywheel, and a disengaged position in which said roller is disengaged from at least two of said spring housing, crankshaft, and flywheel;

wherein said roller converts rotation of said crankshaft and flywheel into rotation of said spring housing in the loading direction when said arm is in said engaged position, to thereby load said elastic member; and wherein said elastic member is selectively unloaded to activate said engine starting mechanism.

16. The engine of claim 15, wherein said spring housing is rotatable about an axis of rotation, and wherein said pivot arm is pivotable about a pivot axis that is non-collinear with said spring housing axis of rotation.

* * * * *